(12) United States Patent
Pustylnik

(10) Patent No.: US 9,397,911 B2
(45) Date of Patent: Jul. 19, 2016

(54) METHOD OF AND DEVICE FOR RECOVERING FROM A ROOT BRIDGE FAILURE

(75) Inventor: Michael Pustylnik, North York (CA)

(73) Assignee: SIEMENS CANADA LIMITED, Ontario (CA)

(*) Notice: Subject to any disclaimer, the term of this patent is extended or adjusted under 35 U.S.C. 154(b) by 959 days.

(21) Appl. No.: 12/874,789

(22) Filed: Sep. 2, 2010

(65) Prior Publication Data

US 2011/0317548 A1 Dec. 29, 2011

(51) Int. Cl.
*H04L 12/26* (2006.01)
*H04L 12/46* (2006.01)
*H04L 12/24* (2006.01)
*H04L 12/751* (2013.01)
*H04L 12/703* (2013.01)
*H04L 12/753* (2013.01)

(52) U.S. Cl.
CPC .......... *H04L 43/0811* (2013.01); *H04L 12/462* (2013.01); *H04L 41/06* (2013.01); *H04L 45/02* (2013.01); *H04L 45/28* (2013.01); *H04L 45/48* (2013.01)

(58) Field of Classification Search
CPC ..... H04L 43/0811; H04L 41/06; H04L 45/02; H04L 12/462
See application file for complete search history.

(56) References Cited

U.S. PATENT DOCUMENTS

| | | |
|---|---|---|
| 6,519,231 B1 | 2/2003 | Ding et al. |
| 6,697,339 B1 | 2/2004 | Jain |
| 7,177,946 B1 | 2/2007 | Kaluve et al. |
| 7,606,177 B1 | 10/2009 | Mahajan et al. |
| 2002/0101875 A1* | 8/2002 | Lui et al. ........................ 370/402 |
| 2007/0242602 A1* | 10/2007 | Pang et al. .................... 370/216 |
| 2008/0240129 A1 | 10/2008 | Elmeleegy |
| 2009/0041112 A1* | 2/2009 | Lee et al. ................. 375/240.01 |

FOREIGN PATENT DOCUMENTS

| | | |
|---|---|---|
| EP | 1 328 890 | 7/2003 |
| EP | 1 722 518 A1 | 11/2006 |
| EP | 2 020 782 | 2/2009 |
| GB | 2249178 A | 4/1992 |
| WO | WO 2008/057932 A1 | 5/2008 |

OTHER PUBLICATIONS

Kothari et al.: "Methodology to Solve the Counter-to-Infinity Problem by Accepting and Forwarding Correct and Updated Information Only Using Test Packet", Advance Computing Conference, 2009. IACC 2009, IEEE International, IEEE, Piscataway, NJ, USA, Mar. 6, 2009, pp. 26-31.

Search Report issued in EP 10175574.2 dated Dec. 20, 2010.

IEEE 802.1D—2004 entitled "IEEE Standard for Local and Metropolitan Area Networks Media Access Control (MAC) Bridges" published Jun. 3, 2004 by the IEEE.

* cited by examiner

*Primary Examiner* — Jackie Zuniga Abad

(57) ABSTRACT

A method and a bridge operative to notify other bridges connected to a network of a root bridge failure by detecting a failure in a connection to the root bridge and generating a root failure suspicion notification (RFSN) bridge protocol data unit (BPDU) that includes a standard Rapid Spanning Tree BPDU portion and a failed root identifier portion uniquely identifying the root bridge which is suspected of failing. The bridge propagates the RFSN BPDU to adjacent bridges in the network to notify them of the failure.

17 Claims, 12 Drawing Sheets

Table 1

| Time for recovery from root R0 failure to new root R1 in ms for mesh topology 501 | | |
|---|---|---|
| TRIAL | with RFSN BPDUs enabled | without RFSN BPDUs enabled and only standard prior art BPDUs |
| 1 | 117 | 7022 |
| 2 | 128 | 1371 |
| 3 | 117 | 1866 |
| 4 | 125 | 364 |
| 5 | 119 | 6310 |
| Average | 121.2 | 3386.6 |

Table 2

| | Time for recovery from root R0 failure to new root R1 in ms for mesh topology 502 | |
|---|---|---|
| TRIAL | with RFSN BPDUs enabled | without RFSN BPDUs enabled and only standard prior art BPDUs |
| 1 | 67 | 436 |
| 2 | 75 | 429 |
| 3 | 67 | 460 |
| 4 | 67 | 510 |
| 5 | 68 | 396 |
| Average | 68.8 | 446.2 |

Table 3

| | Time for recovery from root R0 failure to new root R1 in ms for mesh topology 503 | |
|---|---|---|
| TRIAL | with RFSN BPDUs enabled | without RFSN BPDUs enabled and only standard prior art BPDUs |
| 1 | 200 | 1869 |
| 2 | 192 | 6652 |
| 3 | 201 | 6594 |
| 4 | 192 | 6659 |
| 5 | 184 | 2009 |
| Average | 193.8 | 4756.6 |

| Table 4 | | |
|---|---|---|
| Time for recovery from root R0 failure to new root R1 in ms for mesh topology 504 | | |
| TRIAL | with RFSN BPDUs enabled | without RFSN BPDUs enabled and only standard prior art BPDUs |
| 1 | 146 | 21264 |
| 2 | 146 | 19483 |
| 3 | 146 | 19640 |
| 4 | 145 | 20226 |
| 5 | 149 | 19338 |
| Average | 146.4 | 19990.2 |

Table 5

| TRIAL | with RFSN BPDUs enabled | without RFSN BPDUs enabled and only standard prior art BPDUs |
|---|---|---|
| Time for recovery from root R0 failure to new root R1 in ms for mesh topology 505 | | |
| 1 | 84 | 20642 |
| 2 | 82 | 19083 |
| 3 | 98 | 6864 |
| 4 | 87 | 14034 |
| 5 | 85 | 19152 |
| Average | 87.2 | 15955 |

Table 6

| TRIAL | with RFSN BPDUs enabled | without RFSN BPDUs enabled and only standard prior art BPDUs |
|---|---|---|
| Time for recovery from root R0 failure to new root R1 in ms for mesh topology 506 | | |
| 1 | 71 | 160 |
| 2 | 68 | 126 |
| 3 | 69 | 152 |
| 4 | 69 | 152 |
| 5 | 70 | 138 |
| Average | 69.4 | 145.6 |

METHOD OF AND DEVICE FOR RECOVERING FROM A ROOT BRIDGE FAILURE

This application claims priority to Canadian Application No. 2708737, filed Jun. 29, 2010, the disclosure of which is herein expressly incorporated by reference in its entirety.

FIELD OF THE INVENTION

This invention relates to the field of network configuration protocols used to automatically configure a meshed or arbitrary network into a non-meshed or loop-free topology having a root. More particularly, this invention relates to an improvement in network configuration protocols, such as the Rapid Spanning Tree Protocol (RSTP) to overcome a failure of the root bridge in a configured topology and reduce configuration time to a new loop-free topology in the event of either the failure of the original root bridge or a change in the physical topology such as an intentional or unintentional removal of the root bridge from a configured loop-free topology.

BACKGROUND OF THE INVENTION

Computer networks responsible for the forwarding of data frames to end stations have been known in the past. Computer networks may be organized in local area networks with bridges allowing communications between end stations attached to separate LANs, just as if the stations were attached to the same LAN. A bridge, such as a bridge, is typically a computer with a plurality of ports that couple the bridge to other entities. The bridging function includes receiving data from one of the ports and transferring the data to other ports for receipt by other entities in the network. The bridge is able to move data frames from one port to another port very fast since its decision is generally based on the end station information, such as the media access control (MAC) address information contained in the header of such frames. Bridges typically utilize one of a number of potential protocols for the movement of data as set out in industry standards. One such standard is the IEEE 802.1D-2004 entitled "IEEE Standard for Local and Metropolitan Area Networks Media Access Control (MAC) Bridges" published 3 Jun. 2004 by the IEEE and which is incorporated herein by reference. Other protocols are also available at present and may be possible in the future.

When a computer network is formed, the network will generally have a redundant and usually random communication path between each of the bridges. This arises from various bridges in the networks having their ports connected to other bridges in the network in a redundant manner. Furthermore, bridges may be added or removed periodically to the existing network. In addition, bridges may fail during the operation of the network. This is particularly the case if the bridges are used in harsh environments, such as may be found in industrial applications and/or power generating stations and/or other harsh environments. Furthermore, the network connections between the bridges could fail for a number of reasons. In general, redundant paths in the network are desirable in order to improve the robustness of the network and prevent failure of the network if any one specific connection between two bridges fails or an entire bridge fails. In this way, redundant paths, where two different paths connect the same bridges, can be used to overcome link failures and bridge failures in the network.

However, redundant paths also raise ambiguity in the network. In other words, if there is the possibility of a circuitous or "loop" path being formed in the network, such that a frame could travel in the loop continuously and never reach the end user for which the frame is destined. The creation of a loop in a bridge network therefore raises the possibility that data frames continuously traverse the loop without reaching the end user until the network saturates. The creation of loops in a bridge network also raises ambiguities in the address table within each specific bridge decreasing the efficiency of the network.

To permit the existence of redundant communication paths, but to avoid looping problems, various methods of "pruning" a network into a loop-free or tree configuration have been proposed in the past. One such protocol is the Rapid Spanning Tree Algorithm and Protocol ("RSTP") described in the IEEE 802.1D-2004 standard which is incorporated herein by reference. Previous protocols, such as the "Spanning Tree Algorithm and Protocol" or STP has been proposed in the past but now have been superseded by the "Rapid Spanning Tree and Algorithm and Protocol" (RSTP). A commonality of these protocols is that the resulting topology has a root or root bridge from which the loop-free topology spans forth in a non-redundant loop-free manner.

Difficulties arise, however, in these types of protocols when the root bridge fails. These types of failures, commonly known as "root bridge failures", are particularly problematic because various bridges within the network will continue to assert the failed root bridge as the current root even if they receive information to the contrary from other bridges in the network. Therefore, recovering from a root bridge failure can be more problematic and have a higher reconfiguration time than the original configuration of the spanning tree protocol because in the original configuration, none of the bridges have a predetermined value identifying which bridge is the current root bridge.

The problem arises, in part, because when a root bridge fails, the other bridges identifying the failure of the previous root bridge will asynchronously assert themselves as the new root bridge, but bridges that are not aware of the root bridge failure will continue to assert the original root bridge. In one embodiment, to obtain information necessary to run a spanning tree protocol, bridges will exchange special configuration messages, often called bridge protocol data units (BPDU). More specifically, upon start up of the network, each bridge initially assumes itself to be the root bridge and transmits BPDUs reflecting this. Upon failure of the root bridge, the bridges adjacent to the original root bridge will initially assume themselves to be the new root and transmit BPDUs reflecting this assumption. Upon receipt of a BPDU from a neighbouring device, the bridge will examine the contents of the BPDU and if the root bridge identified in the received BPDU is "better", based on predetermined criteria, than the stored root node identifier in the receiving bridge, the bridge adopts the better information and uses it in its own BPDUs that it sends to other bridges from its ports.

While this process works well at start up, if the original root bridge fails, some of the bridges in the network may continue to send BPDUs identifying the original, now failed, root bridge. This arises for a number of reasons. For example, each bridge will become aware of the potential failure of the original root bridge and asynchronously send BPDUs asserting itself as the new root bridge. Furthermore, in large networks, some bridges located remotely from the root bridge may not become aware of the failure of the root bridge and may reassert the root bridge identifier of the original, now failed, root bridge. It is important to note that the root bridge identifier of the failed root bridge will be the "better" selection which is why the original, now failed, root bridge was selected as the root bridge in the original configuration.

This may increase the time by which a convergence to a new loop-free topology can be created after the failure of a root bridge. Furthermore, while the original root bridge information will eventually be timed out, this may not occur for a significant amount of time, such as a few seconds, because the bridges will be periodically receiving information from some of the other bridges in the network identifying the old, now failed, root bridge as still being active, even though the information is not correct but rather outdated. Such a problem has euphemistically been referred to as "counting to infinity" which refers to the endless process by which the failure of a root bridge is not identified by all of the bridges in a network and they continuously advise each other through different BPDU messages of various potential root bridges including the original, now failed, root bridge, thereby erroneously refreshing the original, now failed, root bridge information.

The problem is further complicated because when the bridge neighbouring the root bridge detects a failure, the bridge neighbouring the root bridge cannot always determine if the failure results from a root bridge failure or from a failure in the link between the root bridge and the neighbouring root bridge. If it is a link failure, then eventually one of the bridges connected to the root bridge will identify an alternative path to the original root bridge. However, if it is a root bridge failure, rather than a root link failure, the above difficulties may arise. Therefore, failure between a root bridge and a neighbouring bridge raises an ambiguity as to whether or not the failure arose due to a failure in the link, a failure in the port of either the root bridge, or the neighbouring root bridge, or, an actual root bridge failure.

Because root bridge failures are not that common, many networks can simply tolerate a temporary shut down of the network due to a root bridge failure while the network reconfigures. Unfortunately, in critical networks, such as industrial applications and power generating stations, a failure of a network, even for a relatively short period of time, such as one second, could result in catastrophic effects. Moreover, a root bridge failure may occur when a small portion of the network has been damaged, such as through an electrical failure or an explosion and it is crucial to have the entire network reconfigure itself to a new loop-free topology quickly to avoid the spread of the catastrophic event throughout the system.

Therefore, while it may take seconds to configure a new root, these seconds can be critical when the reason for the root failing may be a systemic or network wide failure such that the longer the network is down, reconfiguring a new loop-free topology, the more likely it is that the effects of a catastrophic event may spread. Also, it is important that all communications on the network be completed quickly and efficiently. In other words, it is important that all BPDUs are a single frame in length, or 60 bytes in the case of an Ethernet frame, to avoid needless network traffic and the potential for BPDUs to be lost or damaged during transmission, particularly if a portion of the network has been damaged.

In the past, other solutions were proposed. For instance, European patent application EP 1 722 518 A1 to Siemens Aktiengesellschaft, provided a modified Root Failure Notification (RFN) BPDU, which did not exist in any current STP, RSTP or MSTP standard. This modified root failure notification first propagates throughout the system causing restart of the state machines and then a subsequent configuration BPDU is sent to configure a new topology. The difficulty with this solution is that a RFN BPDUs must be sent and received by the bridges and then the bridges must restart their state machines, and then a further configuration BPDUs must then be sent. This increases the time for reconfiguration to a new topology. This solution also lacks any control over false positive root failure notification which could cause a "count to infinity" dilemma of RFN BPDU notifications falsely asserting a failure of a root bridge when only a link or port of the root bridge has failed.

Accordingly, there is a need in the art for an improved method and system for reconfiguring a new loop-free topology with a new root bridge after a root bridge failure. Also, there is a need in the art to provide a method and system to avoid a "counting to infinity" dilemma where bridges in the network asynchronously assert themselves as the new root bridge and no one bridge is identified as the new root bridge because various bridges continuously reassert the previous, now failed, root bridge. Also, there is a need in the art to provide a method and system to avoid a "false positive" counting to infinity dilemma where a link failure to a root bridge is misinterpreted as a root failure and the original root bridge has difficulties reasserting itself as the root bridge in the original non-meshed topology. There is also a need in the art for an improved method and system which at least partially satisfies these needs without deviating from existing and accepted IEEE standards, such as the RSTP including BPDUs used in the RSTP.

SUMMARY OF THE INVENTION

Accordingly, it is an object of this invention to at least partially overcome some of the disadvantages of the prior art. Also, it is an object of this invention to provide an improved type of method and system to identify a root bridge failure and propagate the root bridge failure throughout the network to avoid bridges reasserting the previous, now failed, root bridge. It is also an object of this invention to decrease the convergence time to a new loop-free topology with a new root bridge after a root bridge failure by decreasing network traffic and decreasing the number of BPDUs being transmitted while utilizing the existing RSTP standards as much as possible.

In a further aspect, the present invention resides in a method for notifying bridges connected to a network of a root bridge failure, said method comprises: (a) detecting, by at least one bridge directly connected to the root bridge, a failure in a connection to the root bridge; (b) generating, by the at least one bridge directly connected to the root bridge, a root failure suspicion notification (RFSN) bridge protocol data unit (BPDU) comprising a standard Rapid Spanning Tree BPDU portion and a failed root identifier portion uniquely identifying the root bridge which is suspected of failing; and (c) propagating the RFSN BPDU to adjacent bridges in the network.

In a still further aspect, the present invention resides in a network of bridges interconnected according to an active topology established by a Rapid Spanning Tree Algorithm and Protocol (RSTP), said active topology comprising an original loop-free topology emanating from an original root bridge, an improved method comprising: (a) detecting, at a bridge directly connected to the original root bridge in the original loop-free topology, a failure in the original root bridge; (b) generating, at the bridge directly connected to the original root bridge, a root failure suspicion notification (RFSN) bridge protocol data unit (BPDU) comprising a standard BPDU portion and a failed root identifier portion uniquely identifying the original root bridge; (c) propagating the RFSN BPDU by the bridge directly connected to the original root bridge to adjacent bridges to notify the adjacent bridges of a suspicion that the original root bridge has failed and providing standard BPDU information in the standard BPDU portion as if the original root bridge had failed to commence convergence towards a new loop-free topology with a new bridge other than the original root bridge.

Accordingly, one of the advantages of the present invention is that the RFSN BPDUs used to converge to a new loop-free topology also comprise information identifying the previous, now suspected of failure, root bridge. In this way, the likelihood of bridges propagating incorrect or obsolete information about an original root bridge is decreased. Furthermore, by including the information of the suspicious root bridge in the same BPDU, no additional data messages or BPDUs must be transmitted. In this way, network traffic is not affected by a RFSN BPDU. Furthermore, because only one BPDU is transmitted, network traffic and convergence time is not greatly increased. Furthermore, if the root failed due to a larger catastrophic event, it is possible the entire network communication is compromised. Therefore, having a single BPDU containing the identifier information of the root bridge which is suspected of failing is more likely to be correctly transmitted without errors than if this information is transmitted in two (2) separate BPDUs.

A further advantage of the present invention is that the standard BPDU portion of the RFSN BPDU can be read and understood by all bridges, whether or not they have been modified to look for and recognize the suspicious, potentially failed root bridge information. In this way, the method and system of the present invention is compatible with existing IEEE 802.1D standard networks.

Similarly, the method and system of the present invention is backward compatible with existing RSTP networks meaning that not all of the bridges connected to a network must comprise the ability to read and understand the suspicious root bridge identifier transmitted with the RFSN BPDU. Rather, if some of the bridges connected to the network can recognize the root bridge identifier, but other bridges cannot identify the root bridge identifier, the system will not behave any worse than if none of the bridges could identify the root bridge identifier comprising the RFSN BPDU.

Another advantage of the present method and system relates to having the root bridge identifier in the RFSN BPDU compressed to 7 bytes. As the standard Ethernet header and BPDU occupies 53 bytes of a standard 60 byte Ethernet frame, the RFSN BPDU may comprise the standard BPDU portion and a compressed root bridge identifier portion and still be less than 60 bytes so that it can be transmitted in a standard Ethernet frame. Thus, a second frame is not necessary to transmit the information, decreasing the overall network traffic and decreasing the chance that the second frame is not correctly transmitted.

Another advantage of at least one aspect of the present invention is a time out which is commenced at each bridge to decrease the effects of the problem of a false positive RFSN BPDU being circulated. In one aspect, the time out window is commenced by each bridge after the bridge propagates a valid RFSN BPDU. During the time out, bridges will only process the standard BPDU portion of RFSN BPDUs and the root failure suspicion notification portion will be discarded and will not be propagated. This will give the original root node an opportunity to reassert itself, if it is still active. This is a more targeted and precise solution than the solution provides by the prior art which incorporates a "time to live" in each BPDU limiting the number of "hops" each BPDU may be sent. By having a time out commenced at each bridge after it has propagated a valid RFSN BPDU, a precise manner to ignore future RFSN BPDUs is provided. This permits a quicker resolution of the network and avoids false positive BPDUs incorrectly indicating that the root node has failed, propagating excessively until the "time to live" for each BPDU has been satisfied.

In a further aspect, an additional advantage of the time out provision is that the root failure suspicion notification portion of an RFSN BPDU is not propagated if the root failure suspicion notification does not identify the root bridge identifier of the receiving bridge. In this way, if the RFSN BPDU is out of date, the root failure suspicion notification portion will not be propagated, also facilitating a quicker resolution to a non-meshed or loop-free topology having a root.

Further aspects of the invention will become apparent upon reading the following detailed description and drawings, which illustrate the invention and preferred embodiments of the invention.

BRIEF DESCRIPTION OF THE DRAWINGS

In the drawings, which illustrate embodiments of the invention.

DETAILED DESCRIPTION OF THE PREFERRED EMBODIMENTS

Preferred embodiments of the invention and its advantages can be understood by referring to the present drawings. In the present drawings, like numerals are used for like and corresponding parts of the accompanying drawings.

Figure 1A:
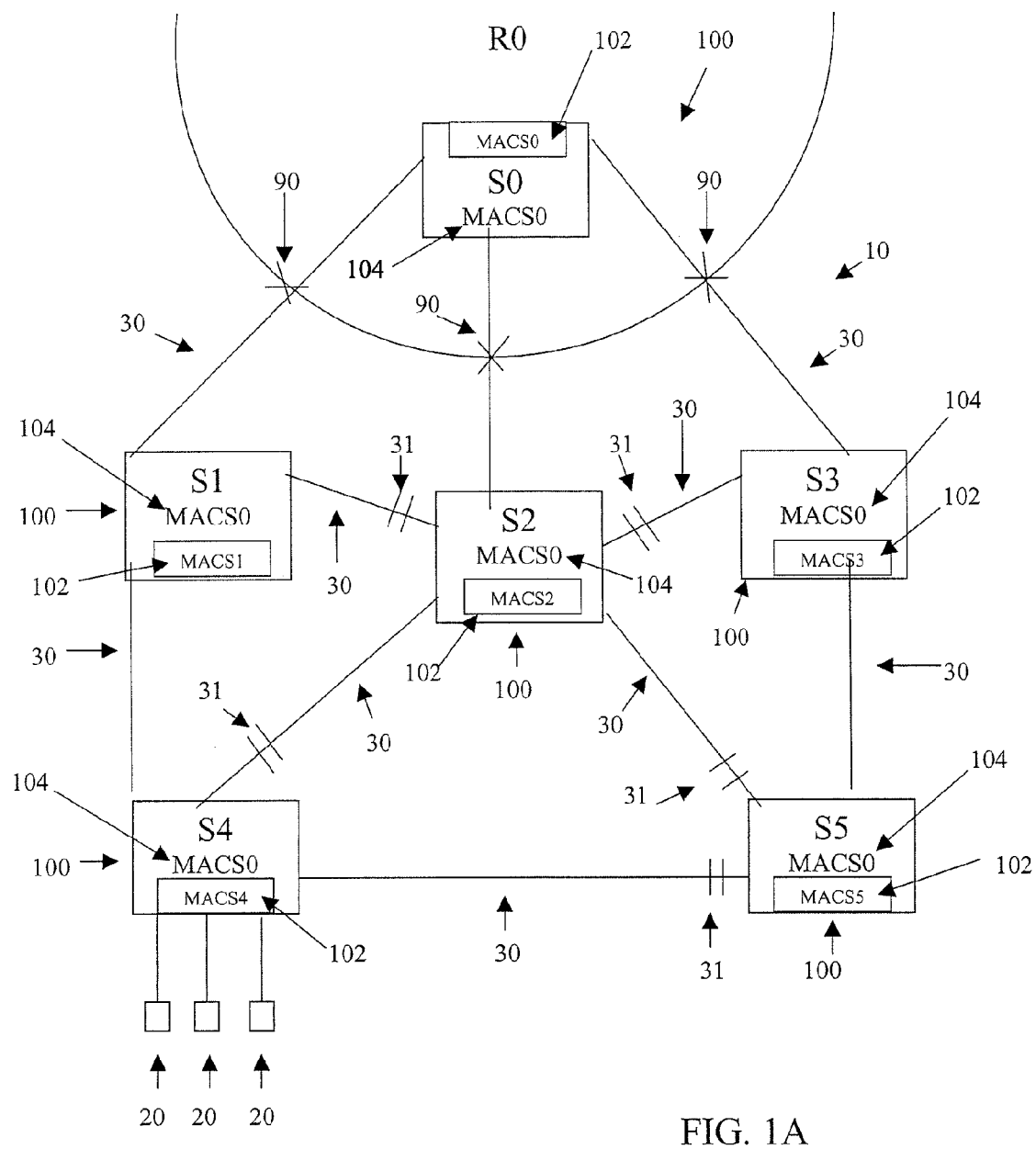
FIG. 1A illustrates a network utilizing one embodiment of the present invention with the meshed or arbitrary network converted into a non-meshed or loop free topology having a root and a failure of the root arising.

As shown in FIG. 1A, one embodiment of the present invention relates to a network, shown generally by reference numeral 10, having a number of bridges 100. The bridges 100 are further identified as S0, S1, S2, S3, S4, S5, for the ease of illustrating the invention according to one specific example. The bridges 100 will also have a media access control address, shown generally by reference numeral 102 and, also, identified as MAC S0, MAC S1, MAC S2, MAC S3, MAC S4, MAC S5 for each of S1, S2, S3, S4, S5, respectively, also for the ease of illustration. It is understood that in specific embodiments the bridges 100 may have additional uniquely identifying criteria, such as bridge priority numbers (not shown). For ease of illustration, only the MAC numbers 102 are shown, but, it is understood that additional numbers or criteria may be associated with each bridge 100 to uniquely identify each bridge 100 in the network 10.

Each bridge 100 performs the function of transmitting data in the network 10. Each bridge 100 may have connections to end nodes, shown generally by reference numeral 20. For ease of illustration, three end nodes 20 are shown connected to bridge S4 only, but it is understood that any number of end nodes 20 may be connected to bridge S4 or any of the other bridges 100 in the network 10. It is also understood that the network 10 will generally comply with the RSTP protocol, or any other compatible or subsequent protocols for transmitting data using the network.

The bridges 100 are interconnected by links, shown generally by reference number 30. The network 10 illustrated in FIG. 1A has already been configured into a non-mesh or loop-free topology having the original root bridge R0 as the root of the network topology. The original root bridge R0 in this example corresponds to bridge S0 having the MAC identifier MAC S0. Each of the bridges 100 will have stored therein a stored root identifier 104 identifying the root node R0. This stored root identifier 104 will generally constitute the media access control address 102 and/or other unique identifier of the root node R0. In this example, the MAC address 102 of the root node R0 is MACS0 because S0 is the root bridge R0 and this is shown as the stored root identifier 104 for each of the bridges S0 to S5. It is understood that the stored root identifier 104 will be contained in a register or other type of internal memory (not shown) of each bridge 100.

Two parallel lines 31 indicate ports which have been rendered inactive in order to configure the meshed or arbitrary network 10 into the non-meshed or loop-free network 10. It is understood that in the case of a failure of one of the bridges 100, including a failure of the root bridge R0, inactive ports 31 may be activated and active ports may be inactivated in order for the network 10 to re-configure a new non-meshed or loop-free topology.

In FIG. 1A, the original root bridge R0 is shown as having failed by the failures 90 shown symbolically by an "X" at each of the links 30 between the original root bridge R0 and each of the adjacent bridges S1, S2, S3. It is understood that the failure 90 of the root bridge R0 may occur in any number of ways. It is also understood that the root bridge R0 may fail, or, each of the links 30 to the root bridge R0 may fail, or both. Furthermore, if the root bridge R0 failed due to a catastrophic event, it is possible that one of the other bridges 100 in the network 10 may also have failed, but for the present purposes and ease of illustration, it is presumed that only the root bridge R0 has failed.

Figure 1B:
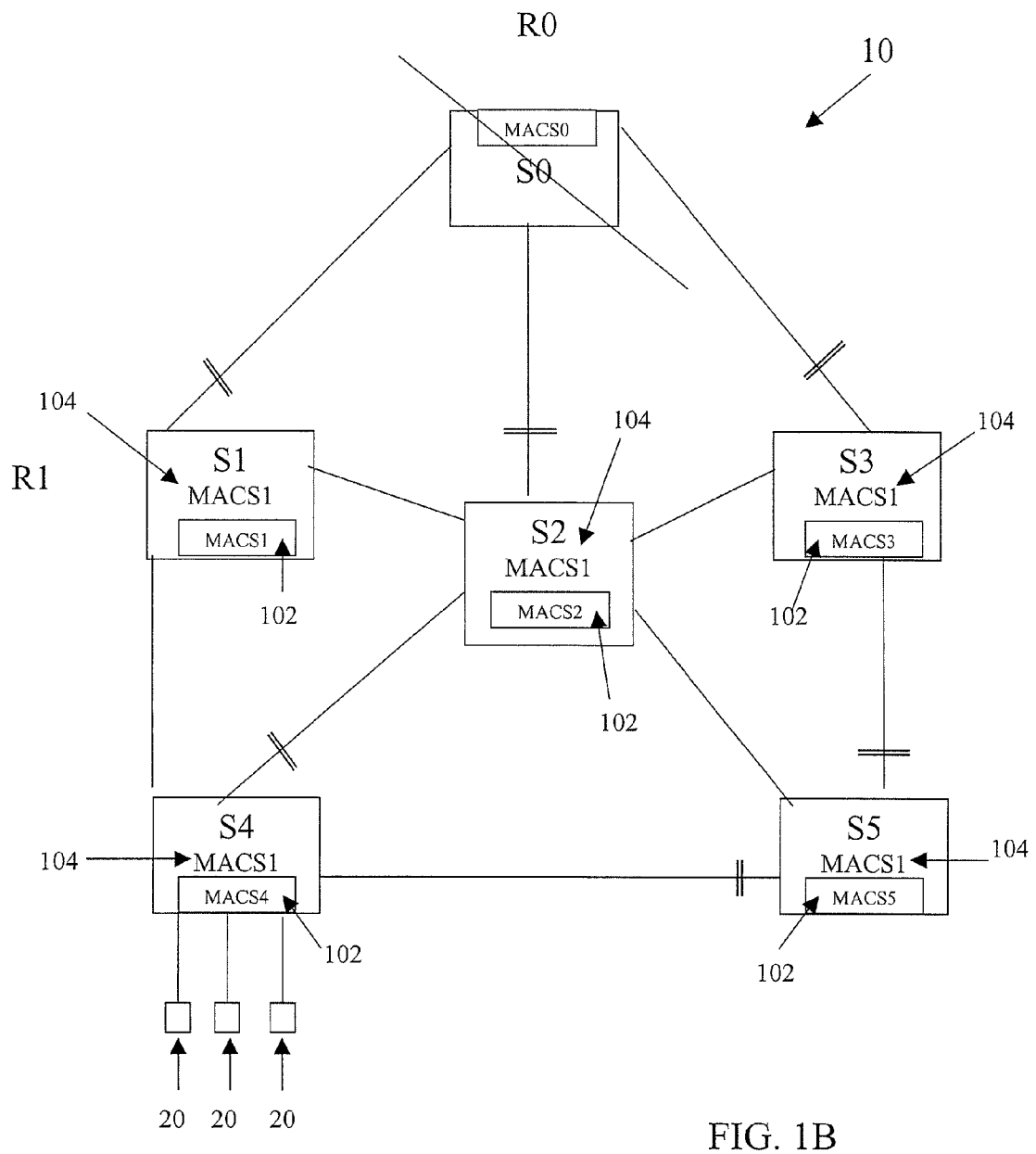
FIG. 1B illustrates the network of FIG. 1A having been reconfigured with the new root R1 after failure of the original root R0.

In this situation, the network 10 will reconfigure itself to a new non-meshed or loop-free topology illustrated in FIG. 1B with the original root bridge R0, S0 shown with a diagonal line therethrough indicating it is inactive. All links 30 to the original root bridge R0, S0 will have been effectively disconnected. The bridge 100 identified as S1 and having the MAC identifier MAC S1, has now been elected as the new root bridge R1 for the re-configured network 10 as illustrated in FIG. 1B.

Figure 3:
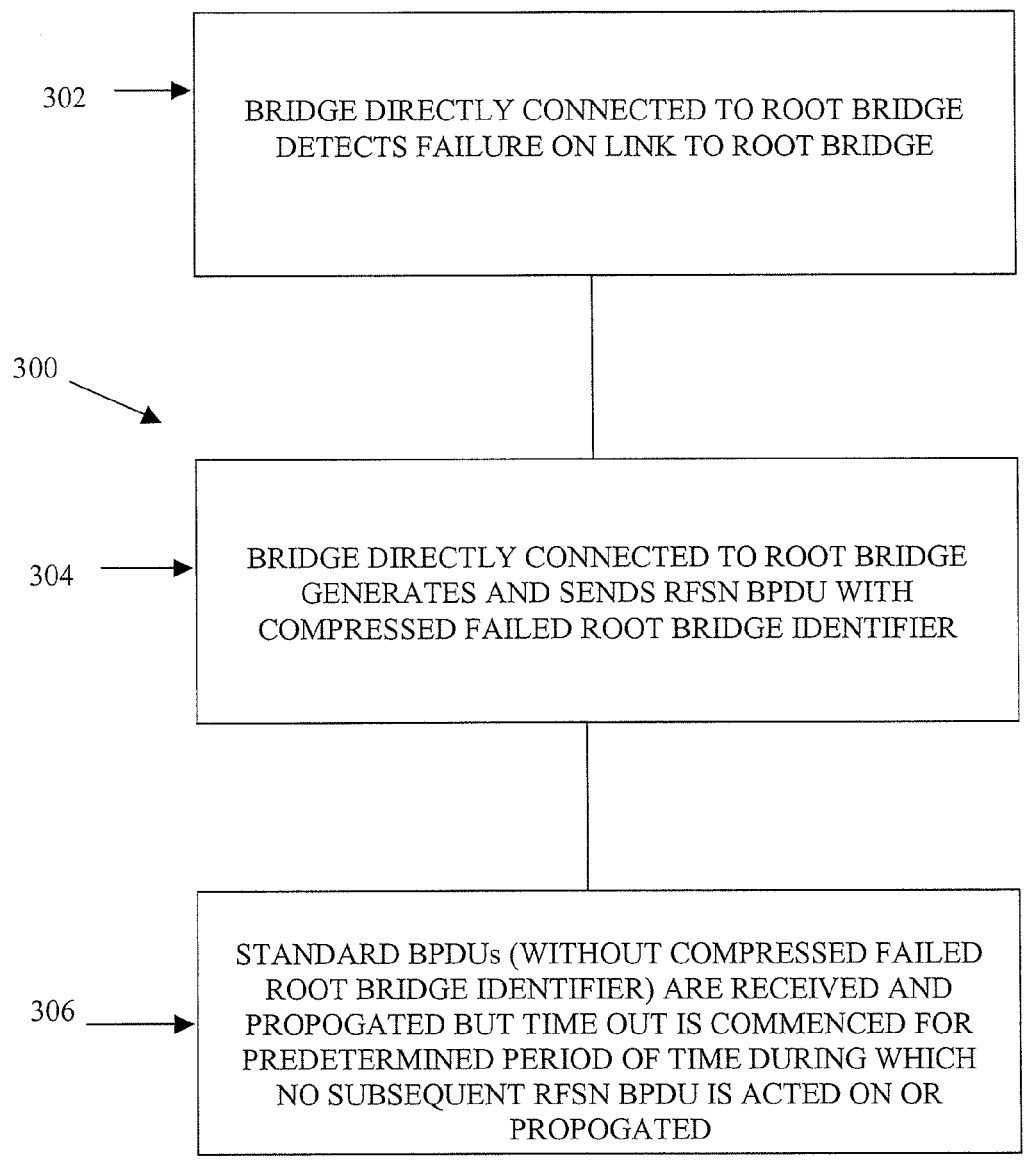
FIG. 3 is a flow chart illustrating the steps taken by a bridge directly connected to the root bridge when a failure of the link to the root bridge is detected.

FIG. 3 illustrates a computerized method, shown generally by reference numeral 300, that may be implemented by the bridges 100 directly connected to the root bridge R0 according to one preferred embodiment of the invention to facilitate this re-configuration from FIG. 1A to 1B. As illustrated at step 302, the bridges 100 directly connected to the original root bridge S0, which in the embodiment illustrated in FIG. 1A are identified as S1, S2 and S3, initially detect the failure on their respective links 30 to the root bridge R0 as identified at step 302 in FIG. 3.

Figure 2:
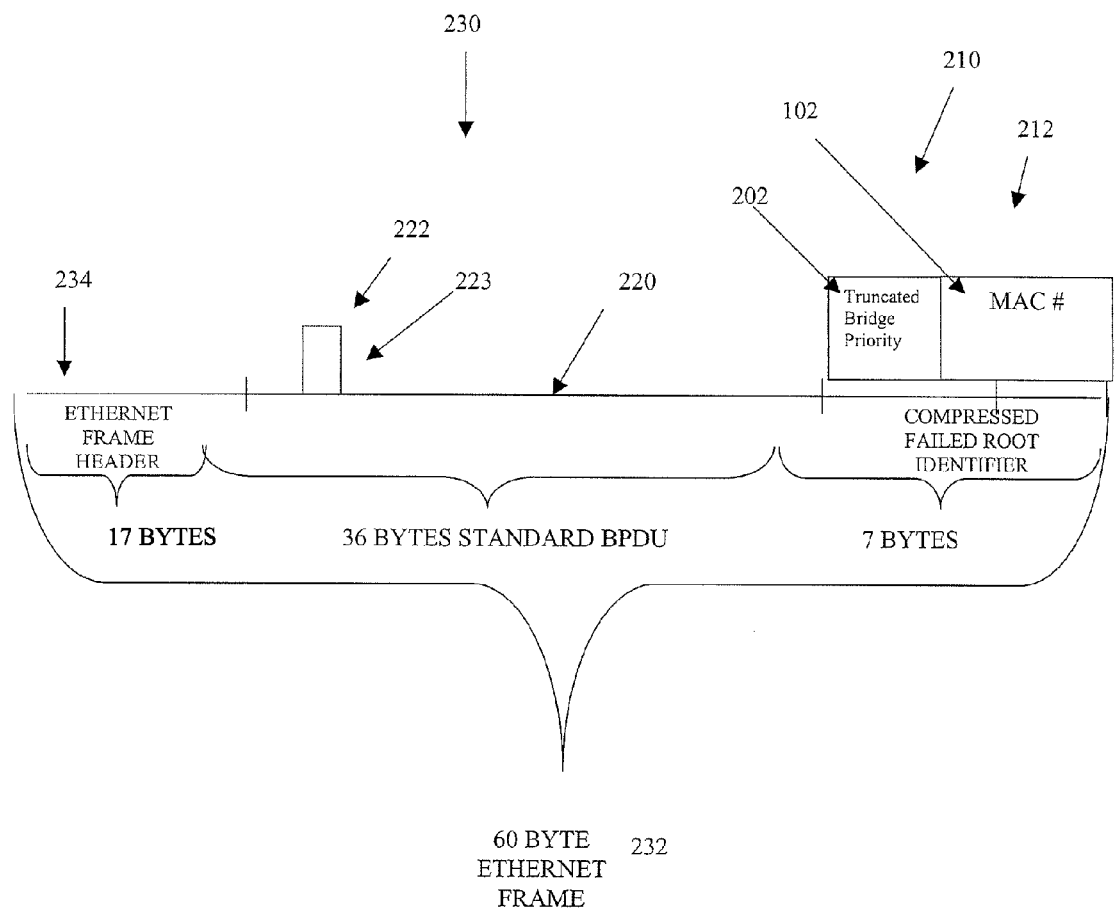
FIG. 2 contains a symbolic representation of an RFSN BPDU comprising a compressed failed root bridge identifier according to one embodiment of the present invention.

As shown in step 302, each of bridges S1, S2 and S3 which are directly connected to the root bridge R0 and detect a failure 90 will generate and send a root failure suspicion notification (RFSN) bridge protocol data unit (BPDU) shown generally by reference numeral 230 in FIG. 2. As illustrated in FIG. 2, the RFSN BPDU 230 preferably has a 36-byte standard BPDU portion, identified generally by reference numeral 220 in FIG. 2, that complies with existing IEEE 802.1D-2004 standard and any equivalents or revisions which may be introduced in the future. The RFSN BPDU 230 also comprises a failed root identifier portion, shown generally by reference numeral 210 in FIG. 2, identifying the root bridge R0 which is suspected of failing as also illustrated in step 304 of FIG. 3.

Once the bridges 100 directly connected to the root bridge R0, namely bridges S1, S2 and S3, generate and propagate the RFSN BPDU 230 with the failed root bridge identifier 210 at step 304, each of the bridges S1, S2 and S3 will then commence a time out for a predetermined time period as shown in step 306. This predetermined time out period may be preferably one second, but other values may be used as selected by the network designer for any particular design consideration. During this time out period, the bridges S1, S2 and S3 may receive standard BPDUs (not shown) as well as RFSN BPDUs 230 and propagate them, but only the standard BPDUs and the standard BPDU portion 220 of any RFSN BPDUs 230 will be acted upon. In other words, during the time out period, the failed root identifier portion 210 of any RFSN BPDU 230 received by the bridges S1, S2, S3 will be ignored. In this way, a false positive notification that the root bridge R0 has failed when, in fact, it has not, will not be overly propagated in the network 10.

It should be noted that all bridges 100 can receive, act on and propagate standard BPDUs (not shown) that comply with the IEEE 802.1D-2004 standard. One aspect of a preferred embodiment of this invention is that the bridges 100 have the ability to process both RFSN BPDUs 230 and standard BPDUs (not shown) which generally comprise information similar to the standard BPDU portion 220 of a RFSN BPDU 230 but do not include, or ignore, the failed root identifier portion of the RFSN BPDU 230.

Figure 4:
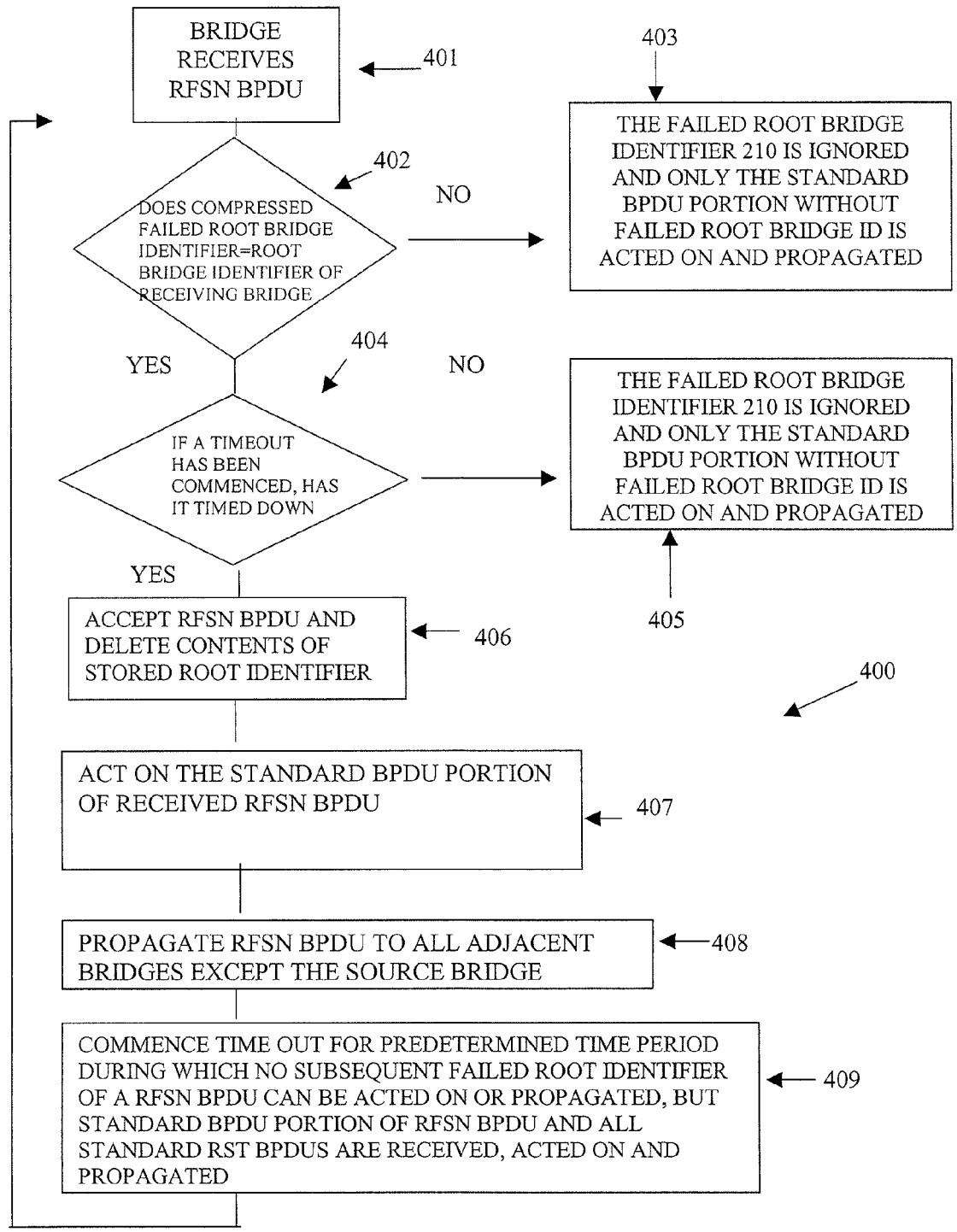
FIG. 4 is a flow chart representing the steps taken by a bridge when it receives a root failure suspicion notification (RFSN) BPDU comprising a compressed failed root bridge identifier according to one embodiment of the present invention.
Figure 5A:
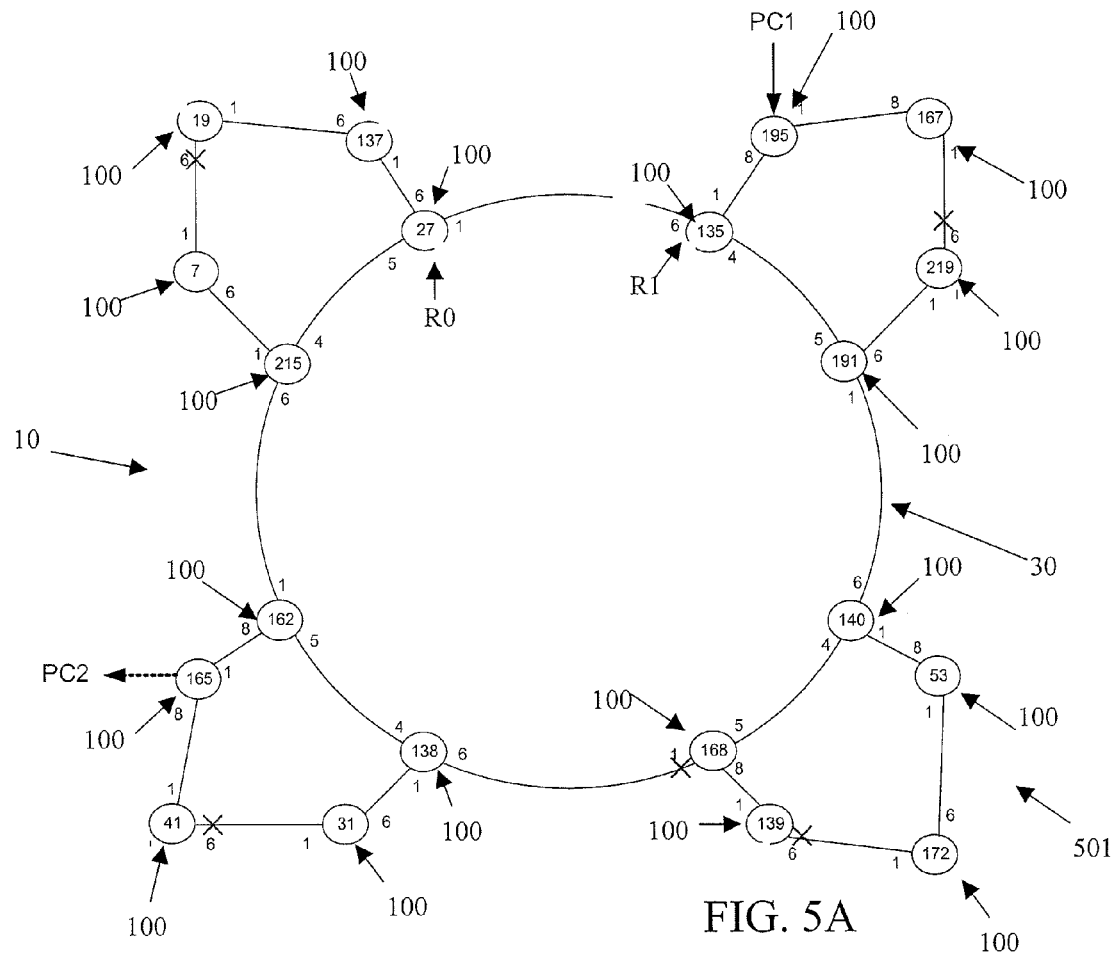
FIGS. 5A, 5B, 5C, 5D, 5E and 5F illustrate experimental results comparing networks of different topologies and bridges with the features of the present invention enabled and bridges without the features of the present invention enabled.
Figure 5B:
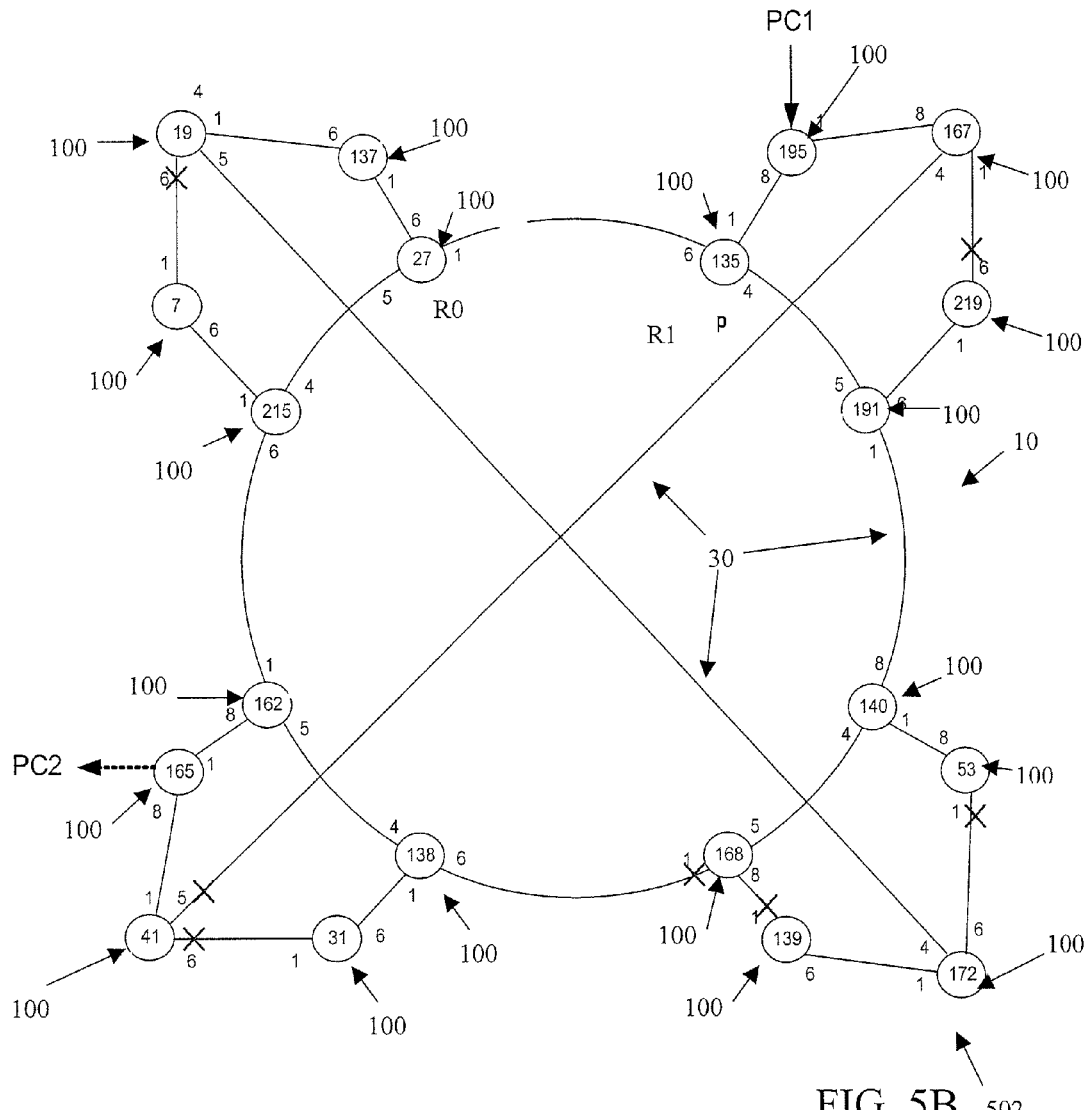
Figure 5C:
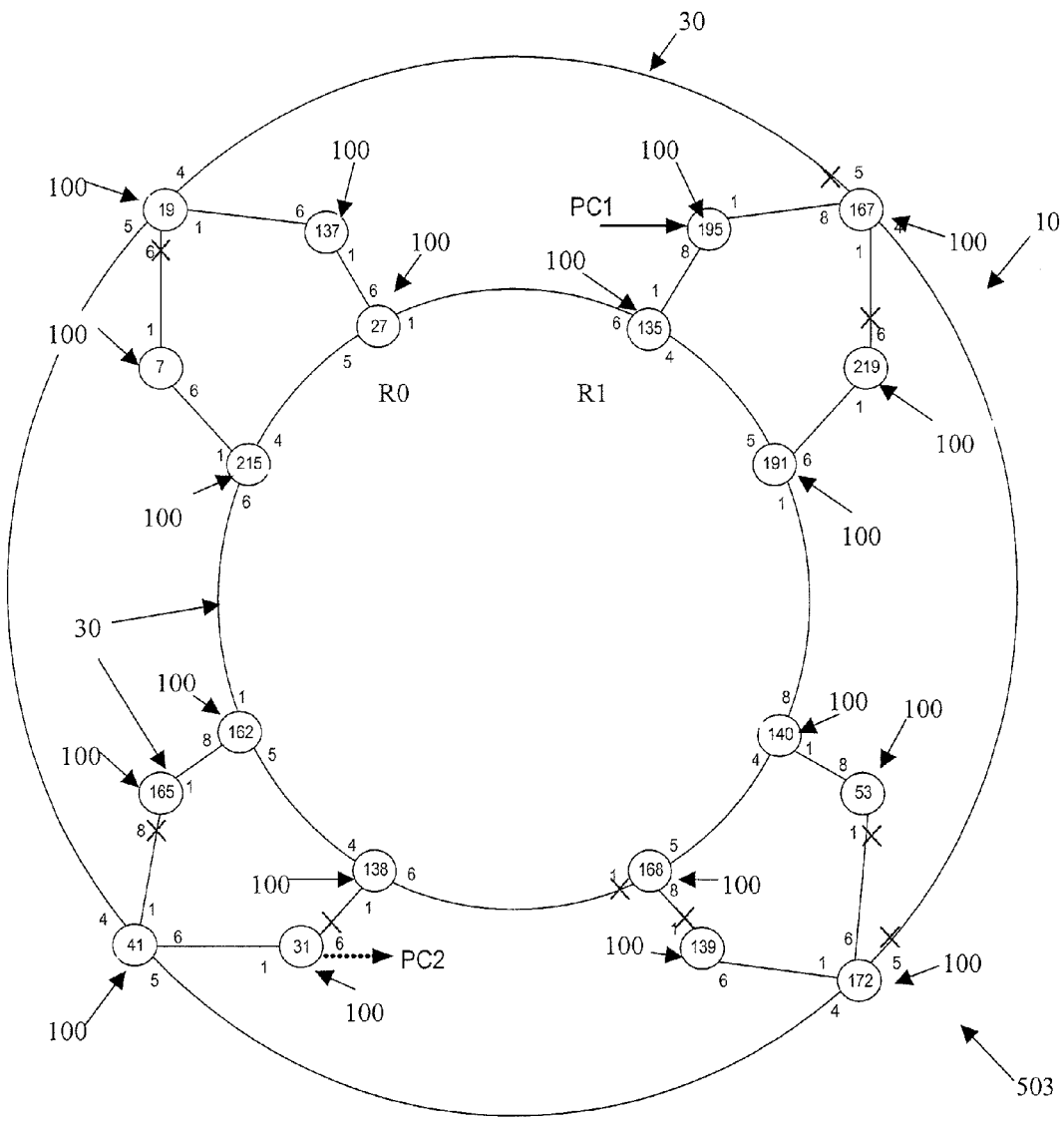
Figure 5D:
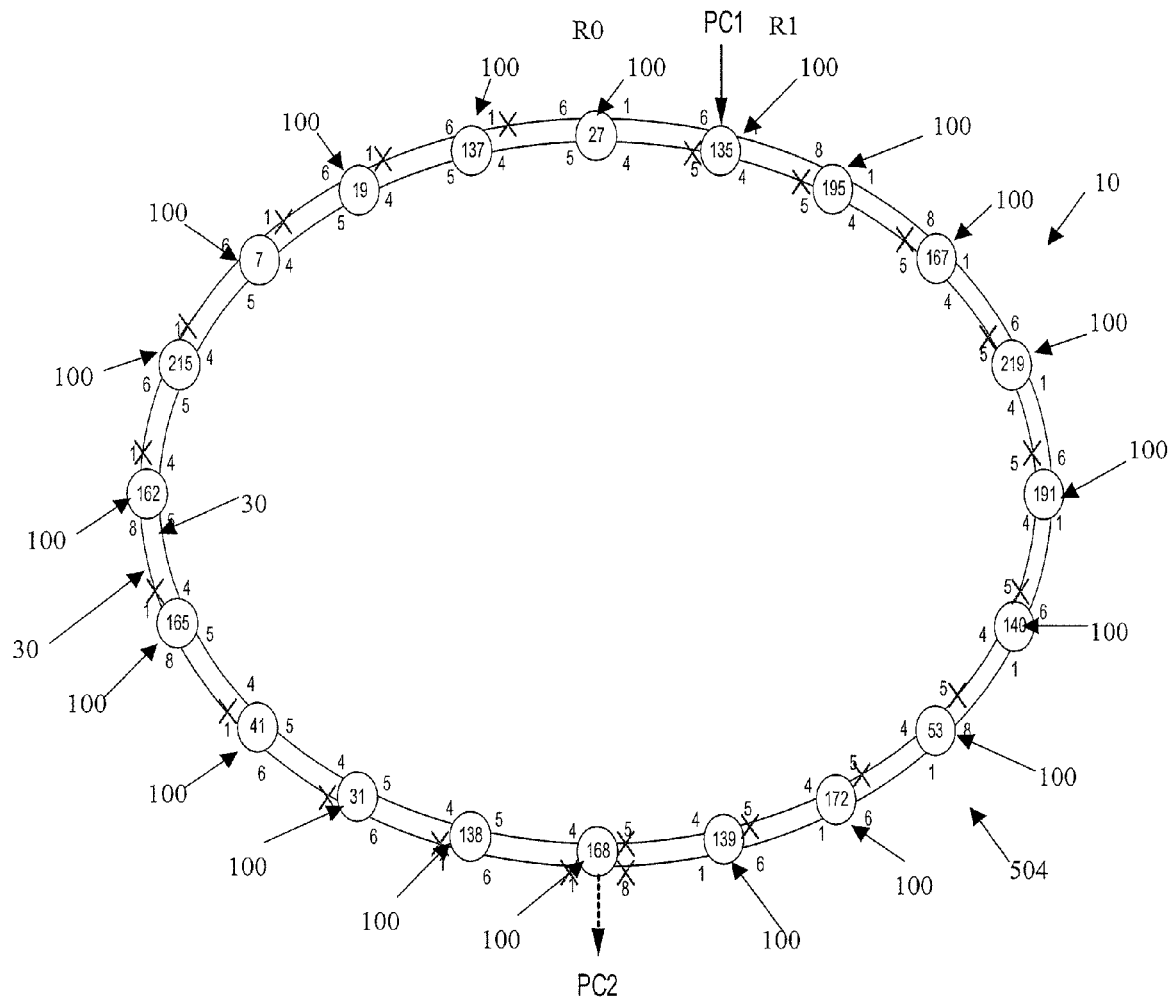
Figure 5E:
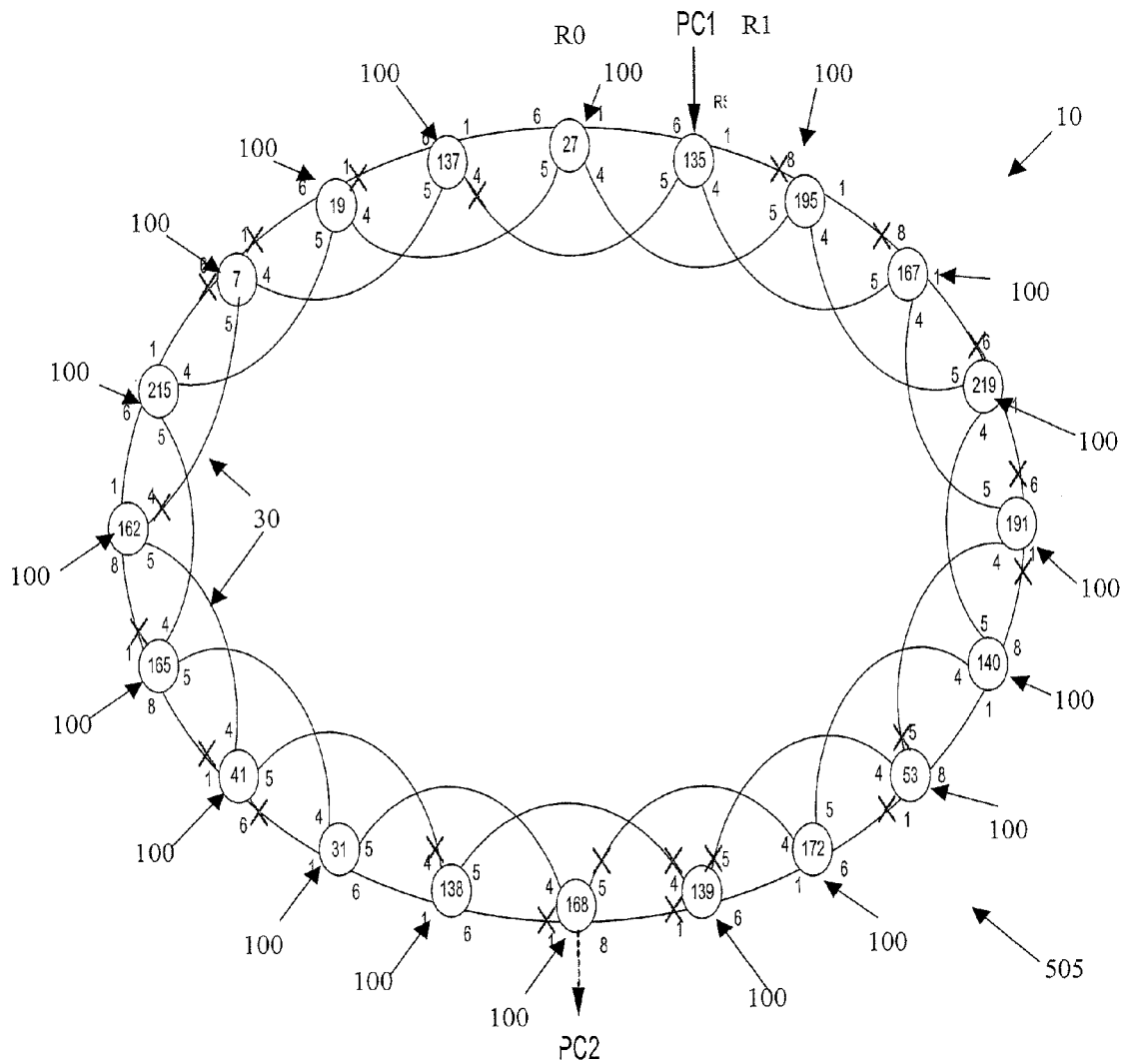
Figure 5F:
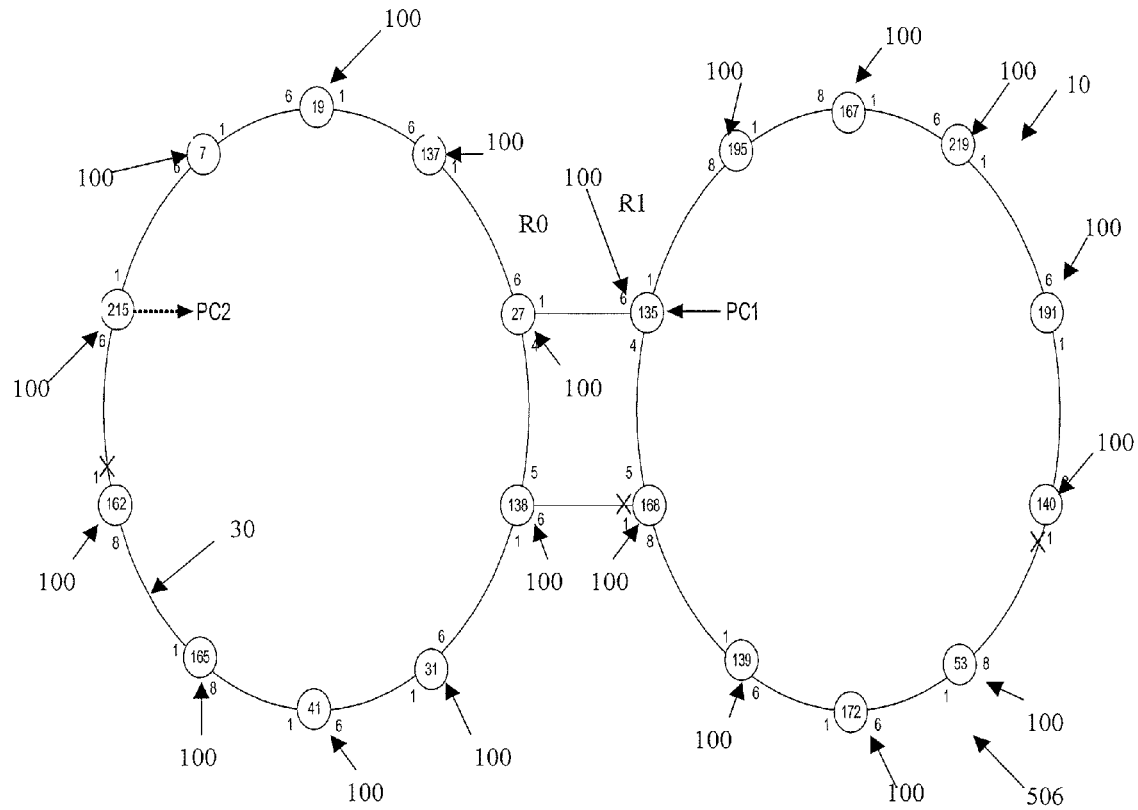

FIG. 4 illustrates the computerized method 400 to be followed by bridges 100 which do not detect a failure on the link 30 to the root bridge R0, but rather receive a RFSN BPDU 230 from another bridge 100. It is understood that the method 400 will be implemented generally by bridges 100 that are not directly connected to the original root bridge R0, such as bridges S4 and S5 of the example illustrated in FIG. 1A. However, it is also understood that the method 400 may be implemented by bridges 100 directly connected to the root node R0, such as bridges S1, S2 and S3 which did not detect a failure on the link 30 to the root bridge R0 before receiving a RFSN BPDU 230 from another bridge 100. For instance, if bridge S3 detects a failure 90 on the link 30 to the root bridge R0 and bridge S3 generates and sends an RFSN BPDU 230 pursuant to step 304 in FIG. 3 before the bridge S2 detects a failure 90 on the link 30 between bridges S2 and the original root bridge R0, bridge S2 will implement the computerized method 400 illustrated in FIG. 400 rather than the method 300 illustrated in FIG. 3. This could occur, for example, in cases where the bridge S3 has merely detected a root bridge failure 90 before the bridge S2 has done so, or, it could also occur in a false positive situation where bridge S3 detects a failure 90 on the link 30 to the root bridge R0 but the bridge S2 has detected no such failure as discussed more fully below with respect to the example illustrated in FIG. 1C.

In any case, whether because the bridge 100 is not directly connected to the original bridge R0, such as bridges S4 and S5, or whether because of timing, any bridges 100 receiving a RFSN BPDU 230 from another bridge 100 will implement the method 400 commencing with step 401. It is also noted that the source bridge 100 which sent the RFSN BPDU 230 may be an intermediate bridge 100 that has received and propagated a RFSN BPDU 230 for another bridge 100 or may be a bridge 100 directly connected to the root R0 that has detected a failure 90 on the link 30 to the root bridge R0 and initially generated the RFSN BPDU 230, such as one of bridges S1, S2 or S3.

In either case, the receiving bridge 100 receiving the RFSN BPDU 230 will proceed to step 402 and determine if the failed root bridge identifier 210 of the received RFSN BPDU 230 is the same as the stored root bridge identifier 104 of the receiving bridge 100. For instance, with respect to bridge S4 in FIG. 1A, if bridge S1 was to detect a failure on the direct link 30 to the root bridge R0 and generate an RFSN BPDU 230, the failed root identifier 210 would identify the original root bridge R0, in this example identified by the value MACS0 in the failed root identifier portion 210 of the RFSN BPDU 230. The receiving bridge S4 would then compare the failed root bridge identifier portion 210 of the RFSN BPDU 230 received from bridge S1 to the stored root identifier 104, which in the example illustrated in FIG. 1A corresponds to the value of MACS0. In this example, condition 402 would be satisfied such that the method 400 proceeds along the path labelled "YES" emanating from 402 to step 404. It should be understood that if the failed root identifier portion 210 does not correspond to the stored root identifier 104 of the receiving bridge 100, then the step 402 will proceed along the path labelled "NO" to step 403. In this step 403, the failed root bridge identifier portion 210 is ignored and only the standard BPDU portion 220 will be acted on and propagated in the normal manner under the IEEE 802.1D standard or equivalent.

If the result of the decision step 402 is positive and the path labelled "YES" is taken, the receiving bridge 100 will proceed to step 404. At step 404, the bridge 100 receiving the RFSN BPDU 230 will then determine if a time out period has been previously commenced and has not timed out. Such a timeout would have been commenced, for instance, if the receiving bridge 100 had previously received an RFSN BPDU 230. If the time out was previously commenced and has not timed out, then this condition 404 would not have been satisfied and the path labelled with the word "NO" to step 405 in FIG. 4 would be taken. In step 405, the failed root bridge identifier portion 210 of the RFSN BPDU 230 would be ignored and only the standard BPDU portion 220 would be acted upon and propagated by the receiving bridge 100.

If the time out has not been commenced, or if it has been commenced and has now timed out, condition 404 would be satisfied and the method 400 would proceed on the path labelled "YES" emanating from step 404 to step 406.

At step 406, the receiving bridge 100 will accept the RFSN BPDU 230, including the failed root identifier portion 210 and delete the value stored in the stored root identifier 104 as shown at step 406. In the example illustrated in FIG. 1A, if bridge S4 received an RFSN BPDU 230 from bridge S1, bridge S4 would delete the value MACS0 from the stored root identifier 104 because the failed root identifier portion 210 of the RFSN BPDU 230 generated by bridge S1 would identify the bridge S0 by having a value representing MACS0 and this would correspond to the value of the stored bridge identifier 104 in S4 satisfying step 402. The method 400 for the receiving bridge S4 then proceeds to step 407 and the receiving bridge S4 acts upon the standard BPDU portion 220.

It is understood that the standard BPDU portion 220 will contain the root bridge identifier for a new root bridge pursuant to the IEEE 802.1D-2004 standard. During the initial arbitration stage, each of the bridges 100 directly connected to the root bridge R0 will each assume that it is the new root and the standard BPDU portion 220 of each of the RFSN BPDUs 230 generated by bridges S1, S2 and S3 will contain their own MAC numbers 102, namely MACS1, MACS2 and MACS3, respectively in this example, as the new root bridge identifier. It is noted that under the prior art, bridge S4 would not have selected any of the MAC numbers MACS1, MACS2 and MACS3 of bridges S1, S2 and S3 contained in the BPDU emanating from any of S1, S2, or S3, over the MAC number 102 of the original root bridge R0, in this example MACS0, because MACS0 would have been the preferred value over each of MACS1, MACS2 and MACS3 which is precisely why original root R0 was initially selected in the original loop-free topology. However, under the present invention, because the stored root identifier 104 has been erased, there is no such value stored in bridge S4, and bridge S4 can select a new root bridge based on the root bridge identifier information contained in the standard BPDU portion 220 of the RFSN BPDU 230 received from any other bridge 100 and without reference to the original root bridge R0 MAC number 102, namely MACS0 in this example, which would otherwise have been preferred and contained in the stored root identifier 104 of bridge S4.

In the example of bridge S4, bridge S4 will select a new root bridge identifier, either MACS1 or MACS2 depending on which of bridges S1 or S2 has already sent a RFSN BPDU 230 to bridge S4. If both bridges 51 and S2 have sent an RFSN BPDU 230 then the bridge S4 will use the standard BPDU portion 220 of the RFSN BPDU 230s to select the bridge 100 which is more appropriate as a new root given the selection criteria of bridge S4 and propagate a new RFSN BPDU 230 with a standard BPDU portion 220 identifying the new root selected by S4. It is important to note that the bridge S4 would not propagate in the standard BPDU portion 220 a MAC number 102 corresponding to the original root node R0, namely MAC value MACS0, because this would have been deleted from the stored root identifier 104 of bridge S4 after it received an RFSN BPDU 230 from either bridge S1 or S2.

Following step 407, the receiving bridge 100 will then propagate a new RFSN BPDU 230 to all of its adjacent bridges 100 except the source bridge 100 at step 408. In the example of bridge S4, if bridge S4 has received the RFSN BPDU 230 from S1, bridge S4 will then propagate a new RFSN BPDU 230 to bridges S2 and S5 which are adjacent to S4 as illustrated in FIG. 1A. Conversely, if bridge S4 first received the RFSN BPDU 230 from bridge S2, bridge S4 will propagate the RFSN BPDU 230 to bridges S5 and S1.

It should be noted that if bridge S5 has already received an RFSN BPDU 230 from bridge S1 or S2, then bridge S5 would have deleted the value MACS0 from its stored root identifier 104 and replaced it with MACS2 or MACS3, such that, if the RFSN BPDU 230 from S4 had a value corresponding to MACS0 in its failed root identifier portion 210, then bridge S5 would not satisfy condition 402 and bridge S5 would proceed to step 403 and ignore the failed root bridge identifier portion 210. It should also be noted that if bridge S5 has already received an RFSN BPDU 230 from bridge S3, and bridge S5 has not timed out, bridge S5 will not satisfy decision step 404 in FIG. 4 and proceed to step 405 thereby ignoring the failed bridge identifier portion 210 of any RFSN BPDU 230 received from bridge S4 or any other bridges 100 even if condition 402 had been satisfied.

After step 408, the receiving bridge 100 will commence a time out for a predetermined period of time during which no subsequent failed root identifier portion 210 of a received RFSN BPDU 230 will be acted upon or propagated. Rather, during the time out period, as discussed above with respect to steps 404 and 405, only the standard BPDU portion 220 of any received RFSN BPDU 230 will be acted on and propagated. The bridge 100 receiving the original RFSN BPDU 230 will then return to step 401 and await any further RFSN BPDUs at step 401 until the network 10 reconfigures a new non-meshed topology. As illustrated in FIG. 1B, if the original root R0 is no longer active, the new root bridge R1 will likely correspond to bridge S1. As illustrated in FIG. 1B, all of the stored root identifiers 104 for each of the bridges 100 will contain the MAC number 102 uniquely identifying the new root bridge, namely the value MACS1 in the example shown in FIG. 1B.

It is also understood that all standard RSTP BPDUs (not shown) which do not contain a failed root identifier portion 210 will also be acted on by the bridges 100. Therefore, if the network 10 contains conventional bridges (not shown) which can not implement the present invention, the bridges 100 which implement the present invention will act on the standard RSTP BPDU (not shown), generated and propagated by such conventional bridges (not shown) in the same manner that the bridges 100 act on the standard BPDU portion 220 of the RFSN BPDU 230. Similarly, the bridges 100 of the present invention will be able to act on and propagate standard RSTP BPDUs from conventional bridges (not shown) in a similar manner to which they act on and propagate the standard BPDU portion 220 of a RFSN BPDU 230 from a bridge 100. These are further features which make the present feature reversibly compatible with standard or conventional bridges (not shown) which do not implement the present invention.

In a preferred embodiment, the RFSN BPDU 230 is contained within a standard 60-byte Ethernet frame, shown general by reference numeral 232 in FIG. 2. The 60-byte Ethernet frame 230 comprises an Ethernet frame header 234 which is generally 17 bytes in length. As also illustrated in FIG. 2, the Ethernet frame 232 comprises the standard BPDU portion 220 which is generally 36 bytes in length. Accordingly, the failed root identifier portion 210 must be no more than 7 bytes in length to fit into the same Ethernet frame 232 which comprises the standard BPDU portion 220.

In one embodiment, to accomplish this, the failed root identifier 210 may be compressed to form a compressed failed root identifier, shown generally by reference numeral 212. The compressed failed root identifier 212 will still have sufficient information to identify the root bridge 100 which is suspected of having failed, but will be compressed meaning that some information may be encoded or truncated.

For instance, in a preferred embodiment, utilizing the RSTP protocol, the bridge identifier uniquely identifying each bridge 100 includes the MAC address 102 of the bridge 100 as well as the bridge priority number of the bridge 100. The bridge priority number is usually 2 bytes in length. The MAC address 102 is generally 6 bytes in length such that the total bridge identifier comprises 8 bytes.

However, in most RSTP applications, the twelve least significant bits of the bridge priority are known and more specifically are set to zero. Therefore, for RSTP networks, only the four most significant bits of the bridge priority are necessary. In one preferred embodiment, the failed root identifier 210 may be compressed to form the compressed failed root identifier 212 by truncating the twelve least significant bits of the bridge priority to form the truncated bridge priority, shown generally by reference numeral 202 in FIG. 2. In this way, the total length of the compressed failed root identifier 212 may comprise 4 bits representing the four most significant bits of the bridge priority 202 and 6 bytes representing the MAC address 102 identifying the root bridge 100 which is suspected of failing. In this way, all of the information, including the Ethernet frame header 234, the standard BTU portion 220 and the compressed failed root identifier portion 212 may be contained in a single 60 byte Ethernet frame 232.

In a further preferred embodiment, when the RFSN BPDU 230 is generated, the bridge 100 generating the RFSN BPDU 230 preferably sets a failed root identifier (FRI) flag, shown generally by reference numeral 222 in FIG. 2, somewhere in the RFSN BPDU 230. The failed root identifier (FRI) flag 222 provides a flag so that the receiving bridge 100 will know to look for the compressed failed root identifier 212. Preferably, the FRI flag 222 is located in the standard RST BPDU portion 220 of the RFSN BPDU 230 because all of the receiving bridges 100 will receive the standard BPDU portion 220 to obtain the other information stored therein for the purposes of executing the RSTP protocol, however, the FRI flag 222 could be located at any other bit which is not used for another purpose. It is understood that if the failed root identifier portion 210 is to be ignored, then the failed root identifier flag 222 may not be set, reflecting the fact that the RFSN BPDU 230 does not contain a failed root identifier portion 210. In other words, when the failed root identifier portion 210 is to be ignored, such as in steps 403 or 405, the receiving bridge 100 will essentially propagate a standard BPDU without a failed root bridge identifier portion and with the FRI flag 222 not set high.

In a further preferred embodiment, the FRI flag 222 corresponds to the topology change acknowledge flag encoded in Bit 8 of Octet 5 in the standard RST BPDU portion 220. In a preferred embodiment, when the network 10 is a RSTP network, the FRI flag 222 corresponds to the topology change acknowledge flag 223 because generally this flag is not used and set low for RSTP networks. As such, the topology change acknowledge flag serves no purpose in the standard BPDU portion 220 and is generally set low or at zero in any event. By setting the topology change acknowledge flag 223 high, and having the bridges 100 according to the present invention look for the topology change acknowledge flag 223 encoded in Bit 8 of Octet 5 of the standard RST BPDU portion 220 set to high or one, the receiving bridge 100 will then know to look for the failed root identifier 210 or the compressed failed root identifier 212 in the preferred embodiment where the failed root identifier 210 has been compressed.

Figure 1C:
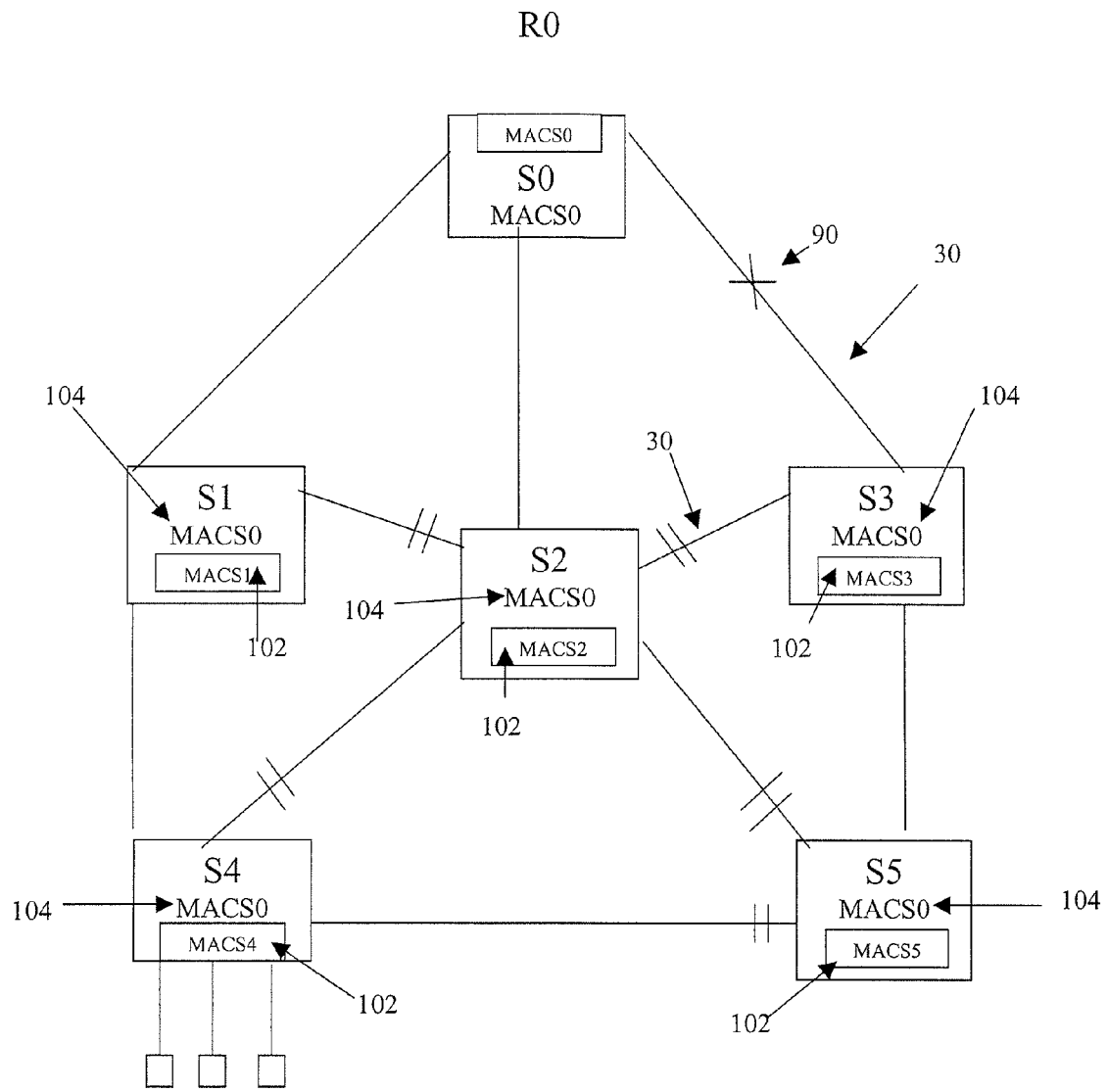
FIG. 1C illustrates the network of FIG. 1A with a false positive signal emanating from bridge S3.

FIG. 1 C illustrates an example of a "false positive" scenario. Specifically, in FIG. 1C, the link 30 between bridge S3 and the root bridge R0, in this example, bridge S0 has a failure 90. In such as situation, bridge S3 does not know if the root R0 has failed or if merely the link 30 to the root R0 has failed. Nevertheless, because bridge S3 is directly connected to the root R0, this ambiguity will be resolved in favour of the root R0 having failed and bridge S3 will commence the method 300 illustrated in FIG. 3. In particular, bridge S3 will detect a failure in the link 30 directly connected to the root bridge R0 at step 302 and then generate and send a RFSN BPDU 230 with the compressed failed root bridge identifier portion 212 identifying the root bridge R0 as set out in step 304 to all adjacent bridges 100, in this example bridges S2 and S5. Bridge S3 will then proceed to step 306 and commence the time out period.

The RFSN BPDU 230 generated by bridge S3 will then be received by adjacent bridges S2 and S5 in FIG. 1C and both bridges S2 and S5 will commence the computerized method 400 illustrated in FIG. 4 at step 401. At step 402 the receiving bridges 100, namely S2 and S5 in this example, will compare the compressed failed root bridge identifier portion 212 of the received RFSN BPDU 230 from bridge S3 to the value stored in their root bridge identifier 104 and find that they both correspond to MACS0 satisfying condition 402. At this point, both bridges S2 and S5 will proceed along the path labelled "YES" from step 402 to step 404. As neither bridge S2 nor S5 will have recently received an RFSN BPDU 230 from another bridge 100, the time out condition set out in step 404 will be answered in the affirmative or ignored because no time out has commenced and both receiving bridges S2 and S5 will proceed along the path labelled "YES" to step 404. At step 406 both bridges S2 and S5 will accept the RFSN BPDU 230 and delete the contents of their respective stored root identifiers 104, namely deleting the value MACS0.

Bridges S2 and S5 will then propagate to all adjacent bridges 100 a RFSN BPDU 230 containing a value corresponding to MACS0 in the compressed failed root identifier portion 212, as shown at step 408. With respect to bridge S5, the adjacent bridges 100 will be bridges S2 and S4. With respect to bridge S2, the adjacent bridges 100 are S0, S1, S4 and S5. Each of bridges S2 and S5 will then commence a time out period at step 409.

Unless an intervening RFSN BPDU 230 has been received resetting the root bridge identifier 104 of bridge S3 to the value of MACS0, bridge S3 will have updated its root bridge identifier 104 to a value other than MACS0 and therefore the failed root identifier portion 210 would be discarded at step 403 because condition 402 would be negative. Furthermore, even if bridge S3 has received an RFSN BPDU 230 resetting the root bridge identifier 104 to the value MACS0 and satisfying condition 402, it should be noted that the bridge S3 has already commenced a time out period at step 306 and, therefore, when bridge S3 receives the RFSN BPDUs 230 from each of bridges S2 and S5, bridge S3 will not satisfy condition 404 and will discard the failed root bridge identifier portion 210 at step 405 of method 400 and simply act on the standard BPDU portion 220.

Each of bridges S0, S1 and S4 will then also execute the method 400 once they receive the RFSN BPDU 230. However, when bridge S0 sends the RFSN BPDU 230, it will assert itself in the standard BPDU portion 220. Pursuant to the IEEE 802.1D standard, the other bridges S1, S2, S3, S4 and S5 will perform an arbitration and converge to a new topology with bridge S0 remaining as the root bridge R0. It is important to note that when the arbitration occurs, the bridges S1, S2, S3, S4 and S5 will all answer "NO" at the condition 404 because they will likely all be in the time out period when they receive the RFSN BPDU 230 from the bridge S0. In this event, the failed root bridge identifier portion 210 will be ignored permitting the original root bridge R0, S0 to reassert itself.

Accordingly, as the root bridge R0, S0 begins to reassert itself, the standard BPDU portion 220 will identify the original root bridge R0, S0 and the root bridge identifier 104 of each of the bridges S0 to S5 will begin to reflect the value MACS0. As this occurs, it is possible that any remaining false positive RFSN BPDUs 230 with the failed root identifier portion 210 having the value MACS0 identifying the original root bridge R0, S0 will satisfy condition 402. Therefore, as the original root bridge R0, S0 begins to reassert itself, and the respective stored root identifiers 104 of bridges S1 to S5 begin to reflect the value MACS0, the condition 402 will commence to be satisfied for each of the bridges 100 that have been correctly updated by the original root bridge R0, S0. This raises the risk that a false positive RFSN BPDU 230 identifying the original bridge R0, S0 will delete the now corrected stored root identifier 104. However, because of the time out condition 404, if a time out has been commenced that has not yet timed out, condition 404 will be answered in the negative and proceed to step 405 thereby preventing the further action and propagation of any false positive RFSN BPDU 230 incorrectly identified the original, still active, root bridge R0, S0 in the failed root bridge identifier portion 210. Accordingly, in this way, the network 10 avoids a "count to infinity" dilemma by giving bridge S0 time to reassert itself as the original bridge R0 even though bridge S3 has detected a failure 90 and sent a RFSN BPDU 230 identifying a suspicion of failure of original root bridge R0, S0. In this way, the time out period commenced by each of the bridges S1, S2, S4 and S5 upon receipt of a RFSN BPDU 230 at step 409 and by bridge S3 when it generates the RFSN BPDU 230 at step 306 gives the original root bridge R0 time to reassert itself avoiding a potential count to infinity dilemma when a false positive RFSN BPDU 230 is generated and propagated, such as in this example by bridge S3.

FIGS. 5A to 5F illustrate various topologies 501, 502, 503, 504, 505 and 506 of the network 10. Briefly, the topologies 501, 502, 503, 504, 505 and 506 illustrate a number of bridges 100 connecting links 30. The bridges 100 are each numbered for the purpose of illustration and this numbering could be considered to correspond to a MAC number 102 or other bridge identifier to uniquely identify each of the bridges 100 in each of the topologies 501 to 506. The symbol "X" in FIGS. 5A to 5F illustrates a discarding of an alternate port as would be done in order to convert the original meshed topologies 501 to 506 into loop free or non-meshed topologies having root bridge R0.

FIGS. 5A to 5F illustrate experimental results performed on the bridges 100 with the RFSN BPDU 230 according to the present invention enabled and without the RFSN BPDU 230 according to the invention enabled and only the standard art BPDU are transmitted.

The following is a table showing the time to recovery from a failure of Root Bridge R0 to the recovery with the new root R1 for topology 501 in milliseconds

TABLE 1

Time for recovery from root R0 failure to
new root R1 in ms for mesh topology 501

| TRIAL | with RFSN BPDUs enabled | without RFSN BPDUs enabled and only standard prior art BPDUs |
|---|---|---|
| 1 | 117 | 7022 |
| 2 | 128 | 1371 |
| 3 | 117 | 1866 |
| 4 | 125 | 364 |
| 5 | 119 | 6310 |
| Average | 121.2 | 3386.6 |

As illustrated from Table 1, five trials were performed and different lengths of time were required to recover from the root bridge R0 failure and assert new root bridge R1. As illustrated in Table 1 at trial 1, the time for recovery with bridges 100 having the RFSN BPDU 230 according to the present invention enabled was only 117 ms. In contrast, without the RFSN BPDUs enabled and only standard prior art BPDUs of the bridges 100, the time for recovery from a root R0 failure to the new root R1 at trial 1 was 7022 ms. Additional trials 2, 3, 4 and 5 are also illustrated in Table 1. As is apparent from the above, significantly less time is required for the network 10 to recover when bridges 100 have the RFSN BPDU 230 feature of the present invention are enabled.

It is also apparent that during the different trails 1 to 5, there is also a variation in the total time difference when the bridges 100 do not have the RFSN BPDU s 230 of the present invention are enabled. This is the case at least because bridges 100 in the network 10 asynchronously notice the failure of the original root R0. As indicated above, the bridge 100 adjacent to the original root R0 will identify the failure first, but it is not certain from that point on how the RFSN BPDUs 230 or the standard BPDUs will be transmitted across topology 501. This increases the time variance for recovery.

Nevertheless, as is apparent from Table 1, the average time for recovery of the five trials when bridges 100 have the RFSN BPDUs 230 of the present invention enabled is 121.2 ms. In contrast, the average time of five trials when the bridges 100 do not have the features of the present invention enabled, and there are only standard prior art BPDUs (not shown) is 3386.6 ms.

In order to confirm the results are not specific to topology 501, tests were performed with respect to the topologies 502 to 506 shown in FIGS. 5B to 5F. The result of these tests is shown below in tables 2 to 6 respectfully.

TABLE 2

Time for recovery from root R0 failure to
new root R1 in ms for mesh topology 502

| TRIAL | with RFSN BPDUs enabled | without RFSN BPDUs enabled and only standard prior art BPDUs |
|---|---|---|
| 1 | 67 | 436 |
| 2 | 75 | 429 |
| 3 | 67 | 460 |
| 4 | 67 | 510 |
| 5 | 68 | 396 |
| Average | 68.8 | 446.2 |

TABLE 3

Time for recovery from root R0 failure to
new root R1 in ms for mesh topology 503

| TRIAL | with RFSN BPDUs enabled | without RFSN BPDUs enabled and only standard prior art BPDUs |
|---|---|---|
| 1 | 200 | 1869 |
| 2 | 192 | 6652 |
| 3 | 201 | 6594 |
| 4 | 192 | 6659 |
| 5 | 184 | 2009 |
| Average | 193.8 | 4756.6 |

TABLE 4

Time for recovery from root R0 failure to
new root R1 in ms for mesh topology 504

| TRIAL | with RFSN BPDUs enabled | without RFSN BPDUs enabled and only standard prior art BPDUs |
|---|---|---|
| 1 | 146 | 21264 |
| 2 | 146 | 19483 |
| 3 | 146 | 19640 |
| 4 | 145 | 20226 |

TABLE 4-continued

Time for recovery from root R0 failure to
new root R1 in ms for mesh topology 504

| TRIAL | with RFSN BPDUs enabled | without RFSN BPDUs enabled and only standard prior art BPDUs |
|---|---|---|
| 5 | 149 | 19338 |
| Average | 146.4 | 19990.2 |

TABLE 5

Time for recovery from root R0 failure to
new root R1 in ms for mesh topology 505

| TRIAL | with RFSN BPDUs enabled | without RFSN BPDUs enabled and only standard prior art BPDUs |
|---|---|---|
| 1 | 84 | 20642 |
| 2 | 82 | 19083 |
| 3 | 98 | 6864 |
| 4 | 87 | 14034 |
| 5 | 85 | 19152 |
| Average | 87.2 | 15955 |

TABLE 6

Time for recovery from root R0 failure to
new root R1 in ms for mesh topology 506

| TRIAL | with RFSN BPDUs enabled | without RFSN BPDUs enabled and only standard prior art BPDUs |
|---|---|---|
| 1 | 71 | 160 |
| 2 | 68 | 126 |
| 3 | 69 | 152 |
| 4 | 69 | 152 |
| 5 | 70 | 138 |
| Average | 69.4 | 145.6 |

As is apparent from Tables 1 to 6, for each of the topologies 501 to 506, the time for recovery from the root R0 failure to the new root R1 is consistently less when the bridges 100 have RFSN BPDUs 230 of the present invention enabled, as compared to the case when the bridges 100 do not have the RFSN BPDUs of the present invention enabled and only standard prior art BPDUs are used. This illustrates the efficacy of the present invention.

Furthermore, in comparison of each of the trials 1 to 5 of each of tables 1 to 6, when the bridges 100 have the RFSN BPDUs 230 of the present invention are enabled, the variation in the times for recovery are small thereby permitting designers to accurately assess and anticipate a solution to any potential root failure when it arises. In direct contrast, the experimental results in Tables 1 to 6 show that when the bridges 100 do not have the RFSN BPDUs 230 of the present invention enabled and only standard prior art BPDUs (not shown) are used, the variation between the Trials 1 to 5 for each topology 501 to 506 varies greatly which makes the effects of a root bridge failure much more difficult to anticipate.

It is understood that the present application has made reference to the term bridges 100. It is understood that a bridge 100 may constitute any type of device that performs this function. Furthermore, without limiting the forgoing, bridge 100 could comprise a switch or a router and the other hardware or software device that performs a similar function.

Typically, the bridges 100 will comply with the 802.1D-2004 standard or equivalent or other compatible or subsequent standards.

To the extent that a patentee may act as its own lexicographer under applicable law, it is hereby further directed that all words appearing in the claims section, except for the above defined words, shall take on their ordinary, plain and accustomed meanings (as generally evidenced, inter alia, by dictionaries and/or technical lexicons), and shall not be considered to be specially defined in this specification. Notwithstanding this limitation on the inference of "special definitions," the specification may be used to evidence the appropriate, ordinary, plain and accustomed meanings (as generally evidenced, inter alia, by dictionaries and/or technical lexicons), in the situation where a word or term used in the claims has more than one pre-established meaning and the specification is helpful in choosing between the alternatives.

It will be understood that, although various features of the invention have been described with respect to one or another of the embodiments of the invention, the various features and embodiments of the invention may be combined or used in conjunction with other features and embodiments of the invention as described and illustrated herein.

Although this disclosure has described and illustrated certain preferred embodiments of the invention, it is to be understood that the invention is not restricted to these particular embodiments. Rather, the invention includes all embodiments, which are functional, electrical or mechanical equivalents of the specific embodiments and features that have been described and illustrated herein.

The embodiments of the invention in which an exclusive property or privilege is claimed are defined as follows:

1. A method for notifying bridges connected to a Rapid Spanning Tree Algorithm and Protocol (RSTP) network of a root bridge failure comprising:
   (a) detecting, by at least one root failure suspicion notification (RFSN) capable bridge directly connected to a root bridge, a failure in a connection to the root bridge;
   (b) generating, by the at least one RFSN capable bridge directly connected to the root bridge, a RFSN bridge protocol data unit (BPDU) comprising;
      i) a standard Rapid Spanning Tree BPDU portion capable of being read and understood by all the bridges; and
      ii) a failed root identifier portion capable of being read and understood by RFSN capable bridges, the failed root identifier portion uniquely identifying the root bridge which is suspected of failing;
   (c) propagating the RFSN BPDU to adjacent bridges in the network; and
   (c1) upon receipt of the RFSN BPDU by a receiving RFSN capable bridge in the network, determining if a time out period has been previously commenced and has not timed out, wherein the time out period would have been commenced if the receiving RFSN capable bridge had previously received a previous RFSN BPDU.

2. The method as defined in claim 1 further comprising:
   (d) upon receipt of the RFSN BPDU by the receiving RFSN capable bridge in the network, comparing the received failed root identifier in the RFSN BPDU to a stored root identifier stored at the receiving RFSN capable bridge; and
   (e) if the root bridge identified in the failed root identifier portion corresponds to the stored root identifier and the time out period has timed out, accepting the RFSN BPDU and deleting the stored root identifier at the receiving RFSN capable bridge.

3. The method as defined in claim 2 further comprising:
   (f) each RFSN capable bridge receiving a RFSN BPDU acting on the standard Rapid Spanning Tree BPDU portion of the RFSN BPDU whether or not the received failed root identifier corresponds to the stored root identifier; and
   (g) propagating the RFSN BPDU to other bridges in the network to repeat steps (d) to (g).

4. The method as defined in claim 2 further comprising:
   when the RFSN BPDU is generated, setting a failed root identifier (FRI) flag in the standard Rapid Spanning Tree BPDU portion; and
   upon receipt of the RFSN BPDU by the receiving RFSN capable bridge, checking for the FRI flag and, if set, comparing the received failed root identifier portion to the stored root identifier at the receiving RFSN capable bridge.

5. The method as defined in claim 1 wherein for non-RFSN capable bridges in the network which lack the capability to identify the RFSN BPDU using Rapid Spanning Tree Algorithm and Protocol (RSTP):
   (d) upon receipt of the RFSN BPDU by a receiving non-RFSN capable bridge in the network, ignoring the failed root identifier portion and propagating the standard Rapid Spanning Tree BPDU portion without the failed root identifier portion.

6. The method as defined in claim 4, wherein the FRI flag corresponds to the Topology Change Acknowledge flag encoded in Bit 8 of Octet 5 in the standard Rapid Spanning Tree BPDU portion.

7. The method as defined in claim 2 wherein the step of generating the RFSN BPDU by at least one RFSN capable bridge directly connected to the root bridge further comprises:
   compressing the failed root identifier portion such that the RFSN BPDU consists of no more than 60 bytes; and
   upon receipt of the RFSN BPDU by the receiving RFSN capable bridge, decompressing the compressed failed root identifier to obtain the bridge identifier uniquely identifying the root bridge which is suspected of failing.

8. The method as defined in claim 7 wherein the network is an Ethernet network; and wherein each RFSN BPDU is contained within a single 60 byte Ethernet data frame.

9. The method as defined in claim 2 further comprising:
   after propagating the RFSN BPDU, commencing a time out period for a predetermined period of time during which the receiving RFSN capable bridge will ignore the failed root identifier portion of any subsequently received RFSN BPDU and will not delete the stored root identifier but will act on the standard Rapid Spanning Tree BPDU portion and propagate the standard Rapid Spanning Tree BPDU portion without the failed root identifier portion.

10. In a network of bridges interconnected according to an active topology established by a Rapid Spanning Tree Algorithm and Protocol (RSTP), said active topology comprising an original loop-free topology emanating from an original root bridge, a method comprising:
    (a) detecting, at a root failure suspicion notification (RFSN) capable bridge directly connected to the original root bridge in the original loop-free topology, a failure in the original root bridge;
    (b) generating, at the RFSN capable bridge directly connected to the original root bridge, a RFSN bridge protocol data unit (BPDU) comprising:

i) a standard Rapid Spanning Tree BPDU portion, capable of being read and understood by all the bridges; and ii) a failed root identifier portion capable of being read and understood by RFSN capable bridges, the failed root identifier portion uniquely identifying the original root bridge;

(c) propagating the RFSN BPDU by the RFSN capable bridge directly connected to the original root bridge to adjacent bridges to notify the adjacent bridges of a suspicion that the original root bridge has failed and providing standard BPDU information in the standard BPDU portion as if the original root bridge had failed to commence convergence towards a new loop-free topology with a new bridge other than the original root bridge; and (c1) upon receipt of the RFSN BPDU by a receiving RFSN capable bridge in the network, determining if a time out period has been previously commenced and has not timed out, wherein the time out period would have been commenced if the receiving RFSN capable bridge had previously received a previous RFSN BPDU.

11. The method recited in claim 10 further comprising:

(d) upon receipt of the RFSN BPDU by a receiving RFSN capable bridge in the network, comparing, at the receiving RFSN capable bridge, the received failed root identifier portion identifying the original root bridge to a stored root identifier stored at the receiving RFSN capable bridge, and (e) if they correspond and the time out period has timed out, accepting the RFSN BPDU and deleting, at the receiving RFSN capable bridge, the stored root identifier.

12. The method as recited in claim 11 further comprising:

(f) each bridge receiving a RFSN BPDU acting on the standard Rapid Spanning Tree BPDU portion of the RFSN BPDU whether or not the received failed root identifier corresponds to the stored root identifier; and (g) propagating the RFSN BPDU to other bridges in the network to repeat steps (d) to (g).

13. The method as recited in claim 12 further comprising:

when the RFSN BPDU is generated, setting a failed root identifier (FM) flag in the standard Rapid Spanning Tree BPDU portion; and upon receipt of the RFSN BPDU by the receiving RFSN capable bridge, checking for the FRI flag and, if set, comparing the received failed root identifier portion to the stored root identifier at the receiving RFSN capable bridge; and wherein, for non-RFSN capable bridges in the network which lack the capability to identify the RFSN BPDU using Rapid Spanning Tree Algorithm and Protocol (RSTP), ignoring the failed root identifier portion and propagating the standard Rapid Spanning Tree BPDU portion without the failed root identifier portion.

14. The method as defined in claim 11 wherein the step of generating the RFSN BPDU by the RFSN capable bridge directly connected to the original root bridge in the original loop-free topology further comprises:

compressing the failed root identifier portion such that the RFSN BPDU consists of no more than 60 bytes; and upon receipt of the RFSN BPDU by the receiving RFSN capable bridge, decompressing the compressed failed root identifier to obtain the bridge identifier uniquely identifying the root bridge which is suspected of failing; and wherein the network is an Ethernet network, and, each RFSN BPDU is contained in a single 60-byte data frame.

15. The method as defined in claim 11 further comprising:

after propagating the RFSN BPDU, commencing a time out period for a predetermined period of time during which the RFSN capable bridge will ignore the failed root identifier portion of any subsequently received RFSN BPDU and will not delete the stored root identifier but will act on the standard Rapid Spanning Tree BPDU portion and propagate the standard Rapid Spanning Tree BPDU portion without the failed root identifier portion.

16. A RFSN capable bridge comprising a processor operative to notify other bridges connected to a network of a root bridge failure by executing the method of claim 1.

17. A computer program stored on a non-transitory computer-readable medium, said medium having stored thereon instructions which, when executed by one or more processors of a RFSN capable bridge, cause the bridge to execute the method recited in claim 1.

* * * * *